United States Patent
Hodapp et al.

(10) Patent No.: US 10,900,275 B2
(45) Date of Patent: Jan. 26, 2021

(54) INTEGRATED TUBE FOR VACUUM INSULATED GLASS (VIG) UNIT EVACUATION AND HERMETIC SEALING, VIG UNIT INCLUDING INTEGRATED TUBE, AND ASSOCIATED METHODS

(71) Applicant: Guardian Glass, LLC, Auburn Hills, MI (US)

(72) Inventors: Timothy Hodapp, Auburn Hills, MI (US); Greg Kemenah, Auburn Hills, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 5 days.

(21) Appl. No.: 16/239,971

(22) Filed: Jan. 4, 2019

(65) Prior Publication Data
US 2020/0217126 A1    Jul. 9, 2020

(51) Int. Cl.
*E06B 3/66*  (2006.01)
*E06B 3/663*  (2006.01)
*E06B 3/667*  (2006.01)

(52) U.S. Cl.
CPC .......... *E06B 3/6612* (2013.01); *E06B 3/6675* (2013.01); *E06B 3/66304* (2013.01); *E06B 3/66342* (2013.01); *Y02A 30/249* (2018.01); *Y02B 80/22* (2013.01)

(58) Field of Classification Search
CPC ........ E06B 3/6612; Y02B 80/24; Y02A 30/25
See application file for complete search history.

(56) References Cited

U.S. PATENT DOCUMENTS

| | | |
|---|---|---|
| 5,657,607 A | 8/1997 | Collins et al. |
| 5,664,395 A | 9/1997 | Collins et al. |
| 5,695,844 A | 12/1997 | Neeser et al. |

(Continued)

FOREIGN PATENT DOCUMENTS

| | | | |
|---|---|---|---|
| CN | 1195334 A | * 10/1998 | ........... E06B 3/6775 |
| CN | 103420582 B | 3/2016 | |

(Continued)

OTHER PUBLICATIONS

Machine translation of cited CN 1195334A, (Year: 1998).*

(Continued)

*Primary Examiner* — Donald J Loney (57) ABSTRACT

Certain example embodiments of this invention relate to vacuum insulated glass (VIG) units, and/or methods of making the same. An integrated pump-out tube is formed in a first substrate such that, when viewed in cross-section, the first glass substrate includes (a) first and second channel portions provided adjacent to opposite sides of a through-hole and (b) first and second sealing wall portions defined therebetween. An edge seal seals together the first and second substrates. A cavity is defined by the first and second substrates. Spacers provided between the first and second substrates in the cavity help maintain the first and second substrates in substantially parallel, spaced-apart relation to one another. The cavity is evacuated to a pressure less than atmospheric. The first and second sealing wall portions are preferentially heating to cause them to sag together and form a bridge covering the through-hole, hermetically sealing the VIG unit.

5 Claims, 6 Drawing Sheets

(56) References Cited

U.S. PATENT DOCUMENTS

| | | | |
|---|---|---|---|
| 5,902,652 A | 5/1999 | Collins et al. |
| 6,383,580 B1 | 5/2002 | Aggas |
| 6,506,472 B1 | 1/2003 | Tanaka et al. |
| 8,794,033 B2 | 8/2014 | Dear |
| 8,833,105 B2 | 9/2014 | Dennis et al. |
| 9,371,683 B2 | 6/2016 | Dennis et al. |
| 9,677,320 B2 | 6/2017 | Cooper |
| 9,695,628 B2 | 7/2017 | Jones |
| 2013/0306222 A1 | 11/2013 | Dennis et al. |

FOREIGN PATENT DOCUMENTS

| | | |
|---|---|---|
| EP | 1013869 A1 | 6/2000 |
| FR | 2774373 A1 | 8/1999 |
| WO | 97/48650 A1 | 12/1997 |

OTHER PUBLICATIONS

U.S. Appl. No. 16/239,850, filed Jan. 4, 2019, Hogan.
International Search Report and Written Opinion for International Application No. PCT/IB2020/050053, dated Apr. 15, 2020, pp. 10.

\* cited by examiner

INTEGRATED TUBE FOR VACUUM INSULATED GLASS (VIG) UNIT EVACUATION AND HERMETIC SEALING, VIG UNIT INCLUDING INTEGRATED TUBE, AND ASSOCIATED METHODS

TECHNICAL FIELD

Certain example embodiments of this invention relate to vacuum insulated glass (VIG) units, and/or methods of making the same. More particularly, certain example embodiments of this invention relate to an integrated tube for VIG unit evacuation and hermetic sealing, a VIG unit subassembly including an integrated tube, a VIG unit made using an integrated tube, and/or associated methods.

BACKGROUND AND SUMMARY

Vacuum insulating glass (VIG) units typically include at least two spaced apart glass substrates that enclose an evacuated or low-pressure space/cavity therebetween. The substrates are interconnected by a peripheral edge seal and typically include spacers between the glass substrates to maintain spacing between the glass substrates and to avoid collapse of the glass substrates that may be caused due to the low pressure environment that exists between the substrates. Some example VIG configurations are disclosed, for example, in U.S. Pat. Nos. 5,657,607, 5,664,395, 5,902,652, 6,506,472 and 6,383,580 the disclosures of which are all hereby incorporated by reference herein in their entireties.

Figure 1:
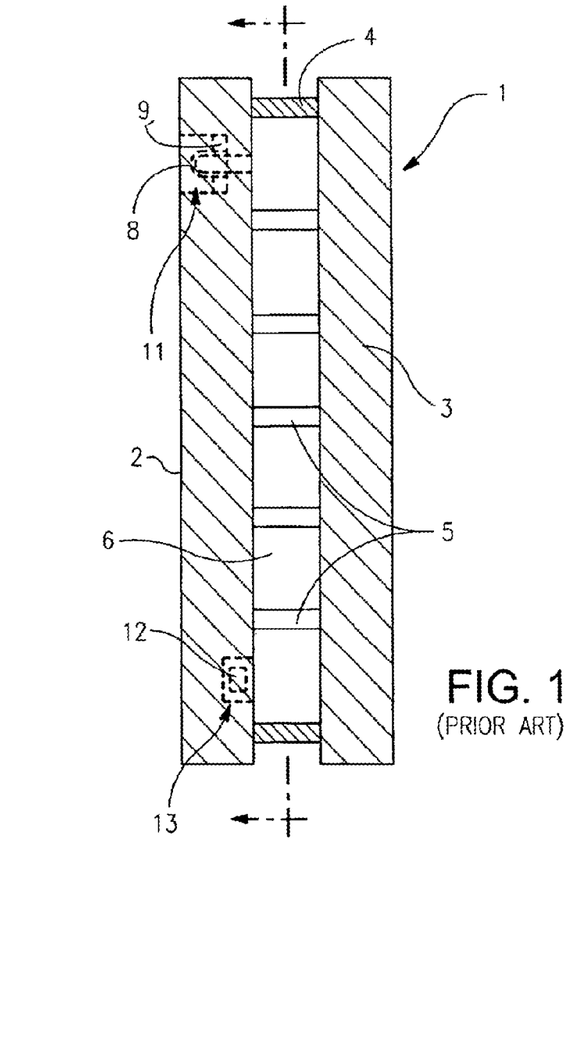
FIG. 1 is a cross-sectional schematic diagram of a conventional vacuum insulated glass (VIG) unit.
Figure 2:
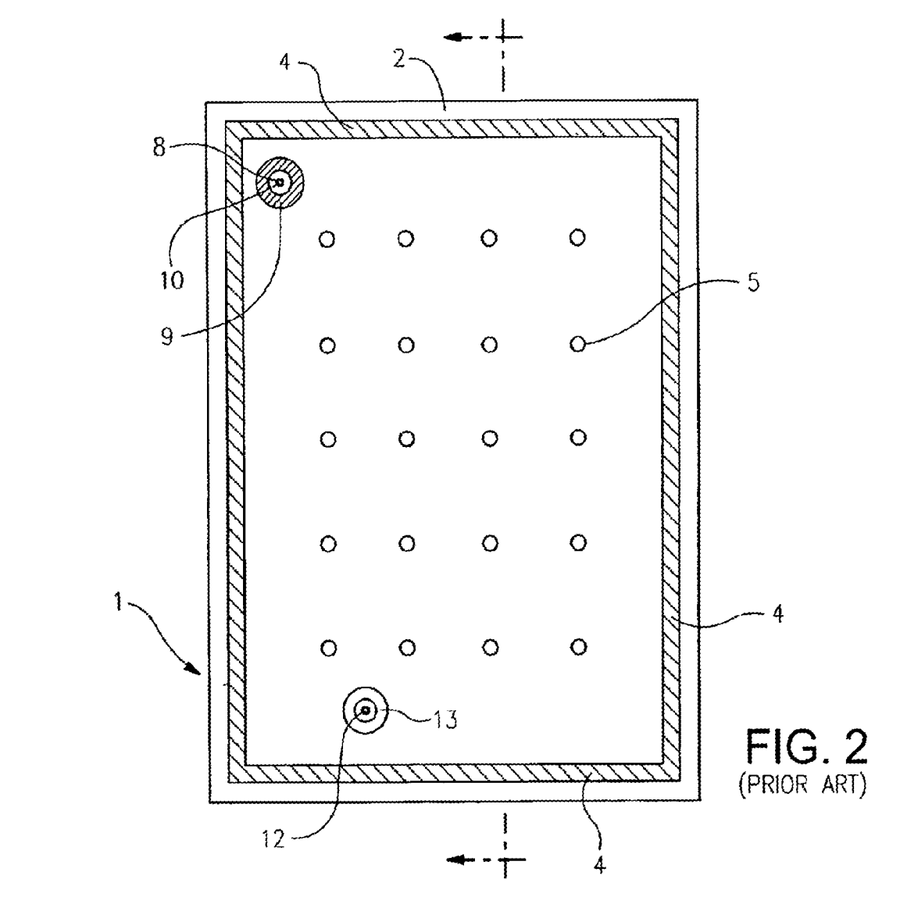
FIG. 2 is a top plan view of a conventional VIG unit.

FIGS. 1-2 illustrate a typical VIG unit 1 and elements that form the VIG unit 1. For example, VIG unit 1 may include two spaced apart substantially parallel glass substrates 2, 3, which enclose an evacuated low-pressure space/cavity 6 therebetween. Glass sheets or substrates 2,3 are interconnected by a peripheral edge seal 4 which may be made of fused solder glass, for example. An array of support pillars/spacers 5 may be included between the glass substrates 2, 3 to maintain the spacing of substrates 2, 3 of the VIG unit 1 in view of the low-pressure space/gap 6 present between the substrates 2, 3.

A pump-out tube 8 may be hermetically sealed by, for example, solder glass 9 to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate the interior cavity 6 to a low pressure, for example, using a sequential pump down operation. After evacuation of the cavity 6, a portion (e.g., the tip) of the tube 8 is melted to seal the vacuum in low pressure cavity/space 6. The optional recess 11 may retain the sealed pump-out tube 8. Optionally, a chemical getter 12 may be included within a recess 13 that is disposed in an interior face of one of the glass substrates, e.g., glass substrate 2. The chemical getter 12 may be used to absorb or bind with certain residual impurities that may remain after the cavity 6 is evacuated and sealed.

VIG units with fused solder glass peripheral edge seals 4 are typically manufactured by depositing glass frit, in a solution (e.g., frit paste), around the periphery of substrate 2 (or on substrate 3). This glass frit paste ultimately forms the glass solder edge seal 4. The other substrate (e.g., 3) is brought down on substrate 2 so as to sandwich spacers/pillars 5 and the glass frit solution between the two substrates 2, 3. The entire assembly including the glass substrates 2, 3, the spacers/pillars 5 and the seal material (e.g., glass frit in solution or paste), is then heated to a temperature of at least about 500 degrees C., at which point the glass frit melts, wets the surfaces of the glass substrates 2, 3, and ultimately forms a hermetic peripheral/edge seal 4.

After formation of the edge seal 4 between the substrates, a vacuum is drawn via the pump-out tube 8 to form low pressure space/cavity 6 between the substrates 2, 3. The pressure in space 6 may be produced by way of an evacuation process to a level below atmospheric pressure, e.g., below about $10^{-2}$ Torr. To maintain the low pressure in the space/cavity 6, substrates 2, 3 are hermetically sealed. Small, high strength spacers/pillars 5 are provided between the substrates to maintain separation of the approximately parallel substrates against atmospheric pressure. As noted above, once the space 6 between substrates 2, 3 is evacuated, the pump-out tube 8 may be sealed, for example, by melting its tip using a laser or the like.

A typical process for installing the pump-out tube 8 in the hole or aperture 10 includes inserting a pre-formed glass pump-out tube 8 in an aperture/hole 10 that has previously been formed (e.g., by drilling) in one of the glass substrates 2. After the pump-out tube 8 has been seated in the aperture/hole 10, an adhesive frit paste is applied to the pump-out tube 8, typically in a region close to the opening of the hole 10 proximate an exterior surface of the glass substrate 2. As noted above, the pump-out tube may be sealed after evacuation or purging of the VIG unit cavity.

After evacuation of the cavity to a pressure less than atmospheric, sealing of the pump-out tube may be accomplished by heating an end of the pump-out tube that is used to evacuate or purge the cavity to melt the opening and thus seal the cavity of the VIG unit. For example and without limitation, this heating and melting may be accomplished by laser irradiation of the tip of the pump-out tube.

It sometimes may be the case that the pump-out tube may not be properly seated in the hole formed in the glass substrate. As a result, the pump-out tube may lean or tilt to one side, and thus not be substantially perpendicular to the surface of the glass substrate in which the hole is formed. As a result, in situations where the pump-out tube is improperly seated and is at an undesirable angle with respect to the surface of the glass substrate, it can become difficult to properly seal the pump-out tube because the laser cannot consistently melt the tip of the pump-out tube because of, for example, differences in distance between various portions of the angled pump-out tube top and the laser source. Inconsistent melting of the top of the pump-out tube may result in incomplete sealing and thus air leakage, which may, depending on the quality of the seal, occur rapidly or more slowly over time. In addition, based on the degree of tilt or tipping of the tube, the laser could hit the tube wall instead of the top. If the laser hits the tube wall, the laser could potentially bypass the tube and hit the frit, which may damage the frit or cause undesirable outgassing into the cavity.

It would seem desirable to provide a way to seat the pump-out tube in the hole to reduce the amount of tipping of the tube to be within an acceptable range. In this regard, attempts have been made to improve the evacuation and/or tip-off processes. See, for example, U.S. Pat. Nos. 9,371,683 and 8,833,105, as well as U.S. Publication No. 2013/0306222, the entire contents of each of which are hereby incorporated herein by reference. Such techniques are advantageous compared to conventional approaches. Yet the inventors of the instant application have recognized that further improvements are still possible.

For example, even when pump-out tubes are properly oriented with respect to the substrate, they still protrude outwardly from an outmost surface of the VIG unit. If the sealed tube is jostled, knocked loose, or broken in whole or in part, the VIG unit may lose vacuum faster than otherwise would be desirable. Caps sometimes are provided over protruding sealed tubes to help protect against shocks that might cause breakage and the like, but such caps have a limited effectiveness against heavy mechanical forces and add additional processing steps and materials to the VIG unit manufacturing process.

Thus, it will be appreciated that it would be desirable to completely eliminate the need for a separate pump-out tube, including a pump-out tube that projects outwardly from an outmost surface of the VIG unit.

One aspect of certain example embodiments relates to the formation of a pump-out tube from, and integral with, one of the substrates comprising the VIG unit. In certain example embodiments, there is no need for a separate pump-out tube that is to be inserted into the VIG unit subassembly. This arrangement in certain example instances simplifies the manufacturing process, e.g., by removing the need to provide and seal a separate, properly-aligned tube.

Another aspect of certain example embodiments relates to the sealing of the integral pump-out tube such that the sealed tube does not protrude past (e.g., is flush with or lies below) an outermost surface of the VIG unit. This arrangement is advantageous in certain example instances because it can reduce and sometimes eliminate the need for a separate protruding protective cap placed above the tube. The removal of the protective cap, in turn, can be advantageous from an aesthetic perspective. Moreover, the removal of the protective cap can be advantageous in terms of reducing the likelihood of damage to the VIG unit and making shipping easier. With respect to the former, as alluded to above, bumping the cap can translate force to the sealed tube, which can cause it to move and/or break, compromising the quality of the vacuum of the VIG. With respect to the latter, because the cap is missing, it may be possible to avoid having to use special shipping and/or packaging materials that accommodate such caps.

In certain example embodiments, a method of making a vacuum insulating glass (VIG) unit is provided. First and second glass substrates are provided. An integrated pump-out tube is formed in the first substrate such that, when viewed in cross-section, the first glass substrate includes (a) first and second channel portions provided adjacent to opposite sides of a through-hole and (b) first and second sealing wall portions defined therebetween. The first and second substrates are sealed together in connection with an edge seal provided around peripheral edges of the first and/or second substrates, a cavity being defined by the first and second substrates, and a plurality of spacers being provided between the first and second substrates in the cavity and helping to maintain the first and second substrates in substantially parallel, spaced-apart relation to one another. The cavity is evacuated to a pressure less than atmospheric. The first and second sealing wall portions are preferentially heated to cause them to sag together and form a bridge covering the through-hole and hermetically sealing the VIG unit.

In certain example embodiments, a method of making a vacuum insulating glass (VIG) unit is provided. The method comprises having first and second glass substrates, the first substrate including an integrated pump-out tube therein, the first substrate, when viewed in cross-section, including (a) first and second channel portions provided adjacent to opposite sides of a through-hole and (b) first and second sealing wall portions defined therebetween. The first and second substrates are sealed together in connection with an edge seal provided around peripheral edges of the first and/or second substrates, a cavity being defined by the first and second substrates, and a plurality of spacers being provided between the first and second substrates in the cavity and helping to maintain the first and second substrates in substantially parallel, spaced-apart relation to one another. The cavity is evacuated to a pressure less than atmospheric. The first and second sealing wall portions are heated to cause them to sag together and form a bridge covering the through-hole and hermetically sealing the VIG unit.

In certain example embodiments, a method of making a vacuum insulating glass (VIG) unit subassembly is provided. A first glass substrate is provided. An integrated pump-out tube is formed in the first substrate such that, when viewed in cross-section, the first glass substrate includes (a) first and second channel portions provided adjacent to opposite sides of a through-hole and (b) first and second sealing wall portions defined therebetween. Following the forming of the integrated pump-out tube, the first substrate is forwarded to another party to: seal together the first substrate with a second substrate, in connection with an edge seal provided around peripheral edges of the first and/or second substrates, a cavity being defined by the first and second substrates, and a plurality of spacers being provided between the first and second substrates in the cavity and helping to maintain the first and second substrates in substantially parallel, spaced-apart relation to one another; evacuate the cavity to a pressure less than atmospheric; and heat the first and second sealing wall portions to cause them to sag together and form a bridge covering the through-hole and hermetically sealing the VIG unit.

In certain example embodiments, a substrate for use in a vacuum insulating glass (VIG) unit, comprises an integrated pump-out tube in the substrate such that, when viewed in cross-section, the first glass substrate includes (a) first and second channel portions provided adjacent to opposite sides of a through-hole and (b) first and second sealing wall portions defined therebetween.

In certain example embodiments, a vacuum insulating glass (VIG) unit comprises first and second glass substrates maintained in substantially parallel, spaced apart relation to one another via a hermetic edge seal and a plurality of spacers disposed in a cavity defined between the first and second glass substrates, the cavity being evacuated to a pressure less than atmospheric using a plugless pump-out port hermetically sealed with a glass bridge melted from a portion of the first glass substrate surrounding the plugless pump-out port.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to improved techniques for evacuating vacuum insulated glass (VIG) units. More particularly, certain example embodiments of this invention relate to an integrated tube for VIG unit evacuation and hermetic sealing, a VIG unit subassembly including an integrated tube, a VIG unit made using an integrated tube, and/or associated methods. When evacuating and subsequently sealing a VIG unit, a pump-out port is used to allow an evacuation path. Conventionally, this port is often sealed by inserting a tube with frit applied thereon into a hole drilled in the glass, firing the frit around the hole, sealing the frit in place, and sealing the tube by melting it with a laser or similar focused energy source, thereby hermetically sealing the VIG unit. Certain example embodiments improve upon this approach by forming a pump-out tube feature into the glass itself, e.g., by drilling or the like. The tube, which is integral with the substrate, is melted using a laser or other focused energy source. Advantageously, no additional tube and no additional frit is used in certain example embodiments. Product yield can be improved without having to add an additional tube and seal it using frit, as the subassembly is already hermetic to the degree desired. This approach advantageously simplifies the VIG process, eliminating assembly and sealing steps, while also reducing complexity of the finished VIG unit.

In certain example embodiments, the sealed integrated tube is flush with, or recessed with respect to, the outer surface of the glass of the VIG. As a result, a protective cap need not be applied thereover. This in turn can lead to easier processing, especially for secondary processes such as lamination, hybrid VIG manufacturing, etc. Additionally, the elimination of an external tube that protrudes outwardly from the substrate may allow for improvements to be realized in shipping approaches, e.g., as additional packing dunnage to properly space apart the VIG units to account for the extra protrusion need not be provided. Standard, or more standard, packaging and the like may be used in certain example embodiments.

There are multiple integrated tube designs that may be used in connection with different example embodiments. The profiles may be formed by creating a through-hole, and a channel or groove around the through-hole. The glass that is left between the through-hole and the channel forms one or more side walls for the through-hole and/or sealing arms for the VIG unit itself. These features may be formed in any suitable manner such as, for example, by drilling into a substrate.

Figure 3A:
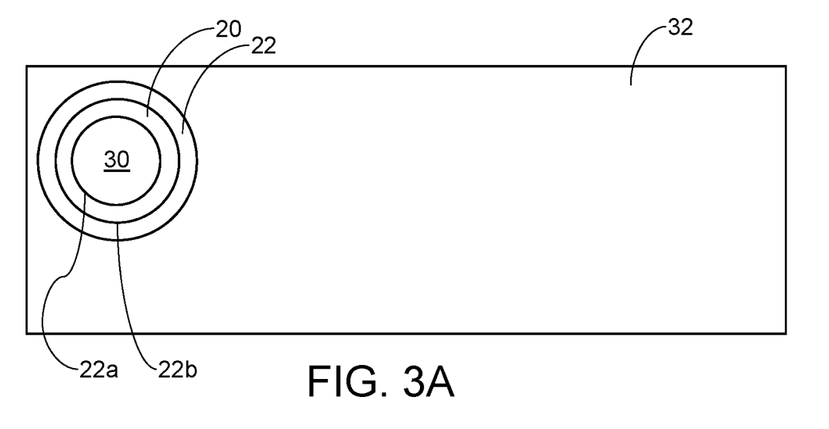
FIG. 3A is a top plan view of a substrate incorporating a first example integrated pump-out tube, in accordance with certain example embodiments.

For example, and referring now more particularly to the drawings, FIG. 3A is a top plan view of a substrate 32 incorporating a first example integrated pump-out tube, in accordance with certain example embodiments. The integrated pump-out tube is at least partially defined by the through-hole 30 and the groove, channel, or recess 22 formed around the through-hole 30. In the FIG. 3A example, a sealing arm 20 is substantially circular and has a thickness defined by inner and outer wall surfaces 22a, 22b. The thickness of the sealing arm 20 varies based on, for example, the dimensions of the groove, channel, or recess 22 relative to the dimensions of the through-hole 30. Different configurations for the groove, channel, or recess 22 are discussed in greater detail below. Ultimately, the sealing arm 20 is melted to collapse over the through-hole 30 and form a "plugless" bridge that hermetically seals the VIG unit.

Figure 3B:
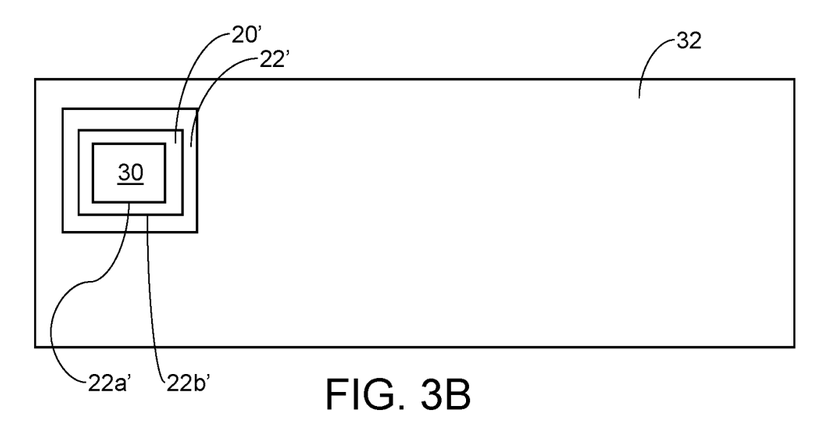
FIG. 3B is a top plan view of a substrate incorporating a second example integrated pump-out tube, in accordance with certain example embodiments.

FIG. 3B is a top plan view of a substrate 32 incorporating a second example integrated pump-out tube, in accordance with certain example embodiments. The FIG. 3B configuration is similar to the FIG. 3A configuration. However, in the FIG. 3B example, the through-hole 30 and groove, channel, or recess 22' both are generally rectangularly-shaped when viewed from a top plan view. As a result, the side-wall 22' defined by inner and outer wall surfaces 22a', 22b' also is generally rectangularly-shaped when viewed from a top plan view.

Figure 3C:
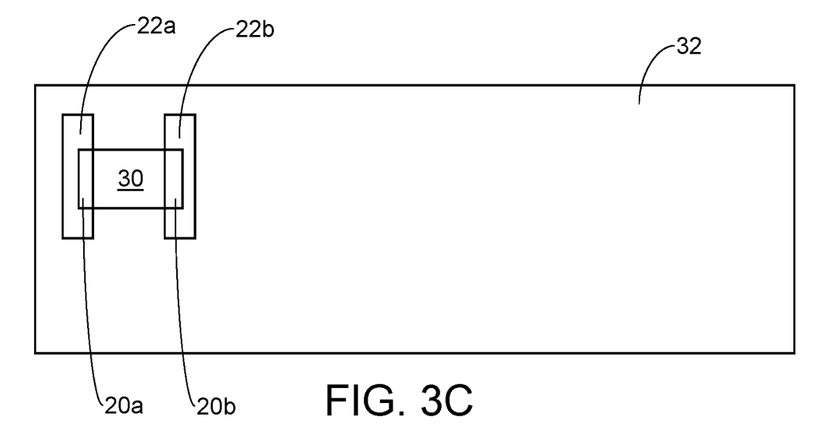
FIG. 3C is a top plan view of a substrate incorporating a third example integrated pump-out tube, in accordance with certain example embodiments.

FIG. 3C is a top plan view of a substrate incorporating a third example integrated pump-out tube, in accordance with certain example embodiments. FIG. 3C is somewhat similar to FIG. 3B in that it includes a generally rectangularly-shaped through-hole 30. However, at least first and second sidewalls or sealing arms 20a, 20b are provided on opposite sides of the through-hole 30. These side walls are formed in connection with first and second grooves, channels, or recesses 22a, 22b. In the FIG. 3C example, the sealing arms 20a, 20b have a height that is the same as or similar to the height of the through-hole 30 but less than the height of the first and second grooves, channels, or recesses 22a, 22b, but other configurations may be used in different example embodiments. For instance, some or all of the height of the through-hole, sealing arms, and recesses may be the same or different, depending on the example embodiments. Although two sealing arms 20a, 20b and two recesses 22a, 22b are shown in FIG. 3C, it will be appreciated that more or fewer sealing arms and/or recesses may be used in different example embodiments.

Although generally circular features are shown in the FIG. 3A plan view, and although generally rectangularly-shaped features are shown in FIG. 3B plan view, it will be appreciated that different example embodiments may use other shapes for such features. For instance, generally square-shaped, ovular, and/or other configurations, when viewed from a plan view, may be used in different example embodiments. It also will be appreciated that differently shaped features may be used in connection with a single embodiment. For instance, when viewed from a plan view, an example embodiment may include a generally circular through-hole and a groove, channel, or recess that at its outer extent is generally square shaped, rectangular, etc. Similarly, when viewed from a plan view, an example embodiment may include a generally rectangular or square-shaped through-hole and a groove, channel, or recess that at its outer extent is generally circular, ovular, etc. Similar observations apply with respect to the FIG. 3C example plan view. For instance, different shapes may be used for the different features (at least when viewed from a plan view) such that, for example, generally rectangular side arms may be used in connection with a generally ovular through-hole and/or generally ovular recesses, channels, or grooves, etc.

Figure 4:
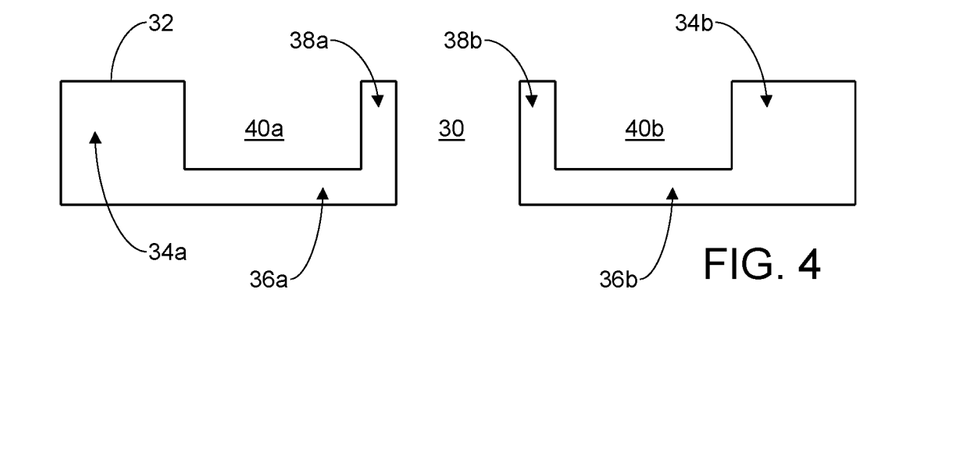
FIG. 4 is a cross-sectional view of a substrate incorporating a first example profile that may be used as an integrated pump-out tube, in accordance with certain example embodiments.
Figure 5:
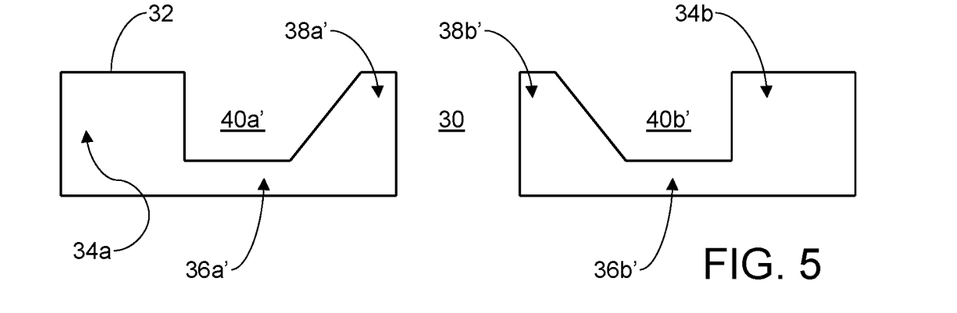
FIG. 5 is a cross-sectional view of a substrate incorporating a second example profile that may be used as an integrated pump-out tube, in accordance with certain example embodiments.
Figure 6:
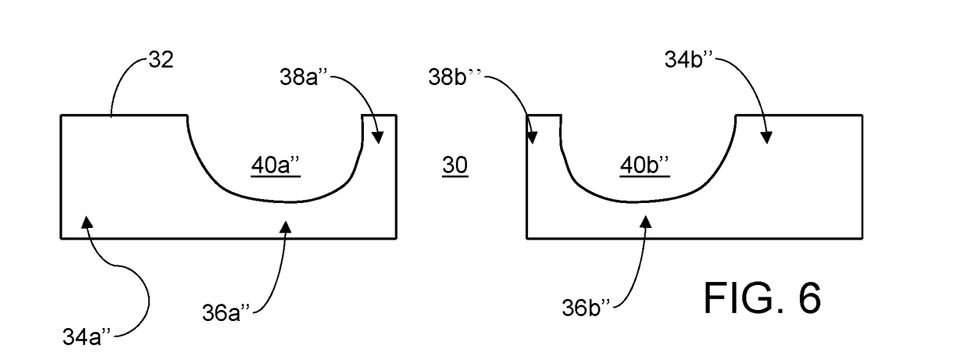
FIG. 6 is a cross-sectional view of a substrate incorporating a third example profile that may be used as an integrated pump-out tube, in accordance with certain example embodiments.

FIGS. 4-6 are cross-sectional views of a substrate incorporating example cross-sections/profiles that may be used as an integrated pump-out tube, in accordance with certain example embodiments. It will be appreciated that FIGS. 4-6 encompass a range of tube dimensions such that a given thickness of glass would be able to adequately seal upon itself when melted with a focused energy source such as, for example, a laser or the like. It will be appreciated that the example cross-sections/profiles shown in and described in connection with FIGS. 4-6 are described as including multiple shoulder portions, multiple upwardly extending arms, multiple reduced thickness portions, and multiple recesses, it will be appreciated that those portions may be discrete structures (e.g., in accordance with the FIG. 3C example plan view and the like) or may be different parts of different respective integral structures (e.g., in accordance with the FIG. 3A and FIG. 3B example plan views and the like).

FIG. 4 shows a first example cross-section. In FIG. 4, the integrated pump-out tube 30 is a through-hole in the substrate 32. The substrate 32 when viewed in cross section includes shoulder portions 34a, 34b, and the shoulder portions have a thickness that matches the full thickness of the substrate 32. A reduced thickness area 36a, 36b surrounds the pump-out tube 30. Upwardly extending arms 38a, 38b help define the depth of the pump-out tube 30. As viewed in cross-section, the shoulder portions 34a, 34b, reduced thickness area 36a, 36b, and upwardly extending arms 38a, 38b define a U-shaped recesses 40a, 40b. The U-shaped recesses 40a, 40b may be formed by drilling or other suitable means, leaving the upwardly extending arms 38a, 38b proximate to, and at least partially defining, the tube 30. The upwardly extending arms 38a, 38b will be collapsed via the laser or other direct energy source to seal the tube 30 and form a bridge portion, as explained in greater detail below. Thus, the upwardly extending arms 38a, 38b have a thickness sufficient to cave in or sag towards one another when heated, and connect to form a cover over the hole 30. The thickness of this cover is thick enough to hermetically seal the VIG unit and avoid collapse under the weight of the vacuum.

It is noted that in certain example embodiments, a single groove, channel, or recess may be provide around the through-hole 30 in FIG. 4 and may include multiple sections (including sections 40a, 40b). Similarly, the FIG. 4 embodiment may have one or more sidewalls/one or more sealing arms. Thus, the upwardly extending arms 38a, 38b shown in FIG. 4 may simply be different parts of a single sidewall or sealing arm, different parts of two or more different sidewall (s)/sealing arm(s) in different example embodiments. As will be appreciated from FIG. 4, when viewed in cross-section, the FIG. 4 example includes one or more substantially U-shaped grooves, channels, or recesses.

FIG. 5 is somewhat similar to FIG. 4 in that it includes generally rectangular shoulder portions 34a, 34b, and reduced thickness areas 36a', 36b'. However, the arms 38a', 38b' are substantially trapezoidally shaped, causing the reduced thickness areas 36a', 36b' to in essence be shorter. The substantially trapezoidal shape of the arms 38a', 38b' is formed so that the height thereof helps define the integrated pump-out tube at the through-hole 30, with the base being broader towards the interior of the VIG unit and shorter towards the exterior of the VIG unit. This shape also helps define generally trapezoidal recesses 40a', 40b'.

The FIG. 5 example arrangement may be advantageous in certain example embodiments because there is more material in the arms 38a', 38b' for use in sealing the integrated tube (e.g., compared to the FIG. 4 example arrangement). In certain example embodiments, the substantially trapezoidal profile may be approximated, e.g., by using a series of drills with differently sized bores/hole cutters, e.g., to form a more stepped or step-like pattern for the profile. For instance, smaller diameter bores may be used closer to the interior surface of the substrate, and the bore size may progressively increase moving outwardly towards the exterior surface of the substrate.

As with FIG. 4, in certain example embodiments, a single groove, channel, or recess may be provide around the through-hole 30 in FIG. 5 and may include multiple sections (including sections 40a', 40b'). Similarly, the FIG. 5 embodiment may have one or more sidewalls/one or more sealing arms. Thus, the upwardly extending arms 38a', 38b' shown in FIG. 5 may simply be different parts of a single sidewall or sealing arm, different parts of two or more different sidewall(s)/sealing arm(s) in different example embodiments. As will be appreciated from FIG. 5, when viewed in cross-section, the FIG. 5 example includes one or more substantially trapezoidially-shaped grooves, channels, or recesses.

FIG. 6 is another example cross-section that may be used in connection with certain example embodiments. As shown in FIG. 6, the recesses 40a", 40b" surrounding the pump-out tube 30 are more curved (e.g., semi-circular), which causes changes in the shapes of the shoulder portions 34a", 34b", the reduced thickness portions 36a", 36b", and the arms 38a", 38b". The curved recesses 40a", 40b" may be substantially U-shaped in certain example embodiments. The U-shape may, for example, be skewed to one side in some instances. For example, in FIG. 6, the U-shape is skewed such that the slope is steeper towards the tube 30, although a skew more like that shown in FIG. 5 may be used in some instances.

As with FIGS. 4-5, in certain example embodiments, a single groove, channel, or recess may be provide around the through-hole 30 in FIG. 6 and may include multiple sections (including sections 40a", 40b"). Similarly, the FIG. 6 embodiment may have one or more sidewalls/one or more sealing arms. Thus, the upwardly extending arms 38a", 38b" shown in FIG. 6 may simply be different parts of a single sidewall or sealing arm, different parts of two or more different sidewall(s)/sealing arm(s) in different example embodiments. As will be appreciated from FIG. 6, when viewed in cross-section, the FIG. 6 example includes one or more substantially trapezoidially-shaped grooves, channels, or recesses.

As noted above, FIGS. 4-6 are cross-sectional views. It thus will be appreciated that the integrated pump-out tube may be any suitable size, shape, or configuration. Consistent with the discussion of FIGS. 3A-3C above, for example, from a plan view, the integrated pump-out tube may by substantially circular, ovular, rectangular, and/or the like. Similarly, consistent with the discussion of FIGS. 3A-3C above, it will be appreciated that there are multiple profiles/cross sections that are suitable to providing the appropriate tube dimensions, and different profiles may be used in different example embodiments.

Figure 7A:
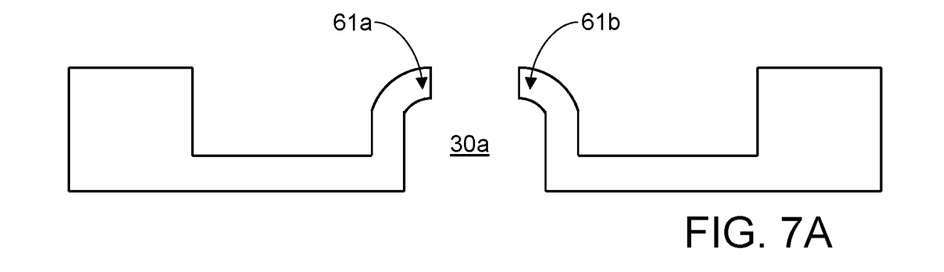
FIGS. 7A-7C schematically illustrate successive stages of the FIG. 4 example profile being selectively heated in sealing the integrated pump-out tube, in accordance with certain example embodiments.
Figure 7B:
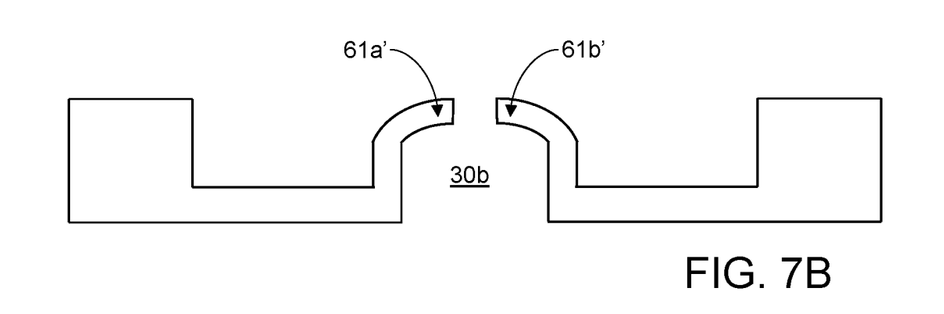
Figure 7C:
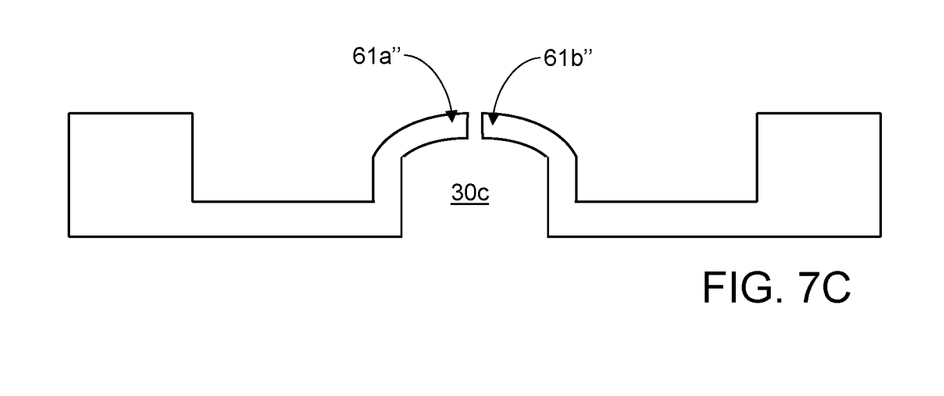

FIGS. 7A-7C schematically illustrate successive stages of the FIG. 4 example profile being selectively heated in sealing the integrated pump-out tube, in accordance with certain example embodiments. Example details as to how the heating can be accomplished are provided below in connection with FIG. 9. Via exposure to the laser or other energy source, the arm(s) is/are caused to collapse or sag inwardly towards one another. Thus, tip portions 61*a*, 61*b* begin to close up the tube 30*a* in FIG. 7A. Continued exposure to heat further closes the tube 30*b*, bringing the tips 61*a*', 61*b*' yet closer together in FIG. 7B. At FIG. 7C, the tube 30C is nearly entirely closed, as the tip portions 61*a*", 61*b*" sag even closer towards one another.

In certain example embodiments, the heating may be preferential heating that includes a first or core heating phase to substantially melt the sealing wall, followed by a second phase that causes the first and second sealing wall portions to sag together and form the bridge. One or both of these phases may preferentially heat the sealing wall relative to the rest of the VIG unit subassembly. Laser heating may be used for either or both phases in different example embodiments. Although laser heating is mentioned herein, it will be appreciated that infrared (IR) heating may be used in connection with any heating procedure described herein.

Figure 8:
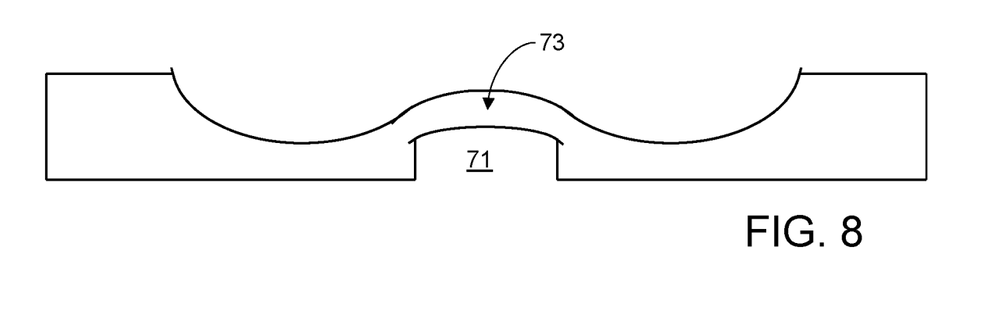
FIG. 8 is a cross-sectional view of a substrate incorporating a sealed integrated tube, in accordance with certain example embodiments.

FIG. 8 is a cross-sectional view of a substrate incorporating a sealed integrated tube, in accordance with certain example embodiments. As can be seen in FIG. 8, the tube is sealed. There is thus a bridge or cover 73 over the pocket 71. The pocket 71 is interior to the VIG unit and is held at vacuum. In certain example embodiments, the cover 73 is flush or substantially flush with the shoulder portions of the substrate, as can be appreciated from FIG. 8. In certain example embodiments, the cover 73 is not flush with the outer surface of the substrate but does not protrude beyond it. In certain example embodiments, a structural or non-structural sealant material may be provided around the cover 73, e.g., to "fill in" any recessed area relative to the outer surface of the substrate.

In certain example embodiments, where an integrate tube is provided, the through-hole may be 0.5-5 mm in diameter or major distance, more preferably 1.5-4 mm in diameter or major distance, and still more preferably 2-3.5 mm in diameter or major distance. In certain example embodiments, the tube sidewall thickness may be 0.2-0.5 mm thick, more preferably 0.25-0.45 mm thick.

The techniques of U.S. Pat. No. 9,371,683 (the entire contents of which are hereby incorporated herein by reference) may be used to seal the integrated tube, e.g., by tracing smaller and smaller circles or other connected patterns around the tube proximate to the sidewall(s)/sealing arm(s) so as to cause opposing edges of the sidewall(s)/sealing arm(s) to sag towards one another and form a bridge (e.g., as shown in FIG. 8). In cases where multiple separate sidewalls/sealing arms are provided, progressive scans of narrower width may be used to similar effect. For instance, one or more lasers may be used to scan along first and second upwardly projecting sealing arms to cause them to sag towards one another. The laser(s) may be focused along scan lines or scan areas that are increasingly close to one another, e.g., as the sag continues to develop in the formation of the bridge.

Figure 9:
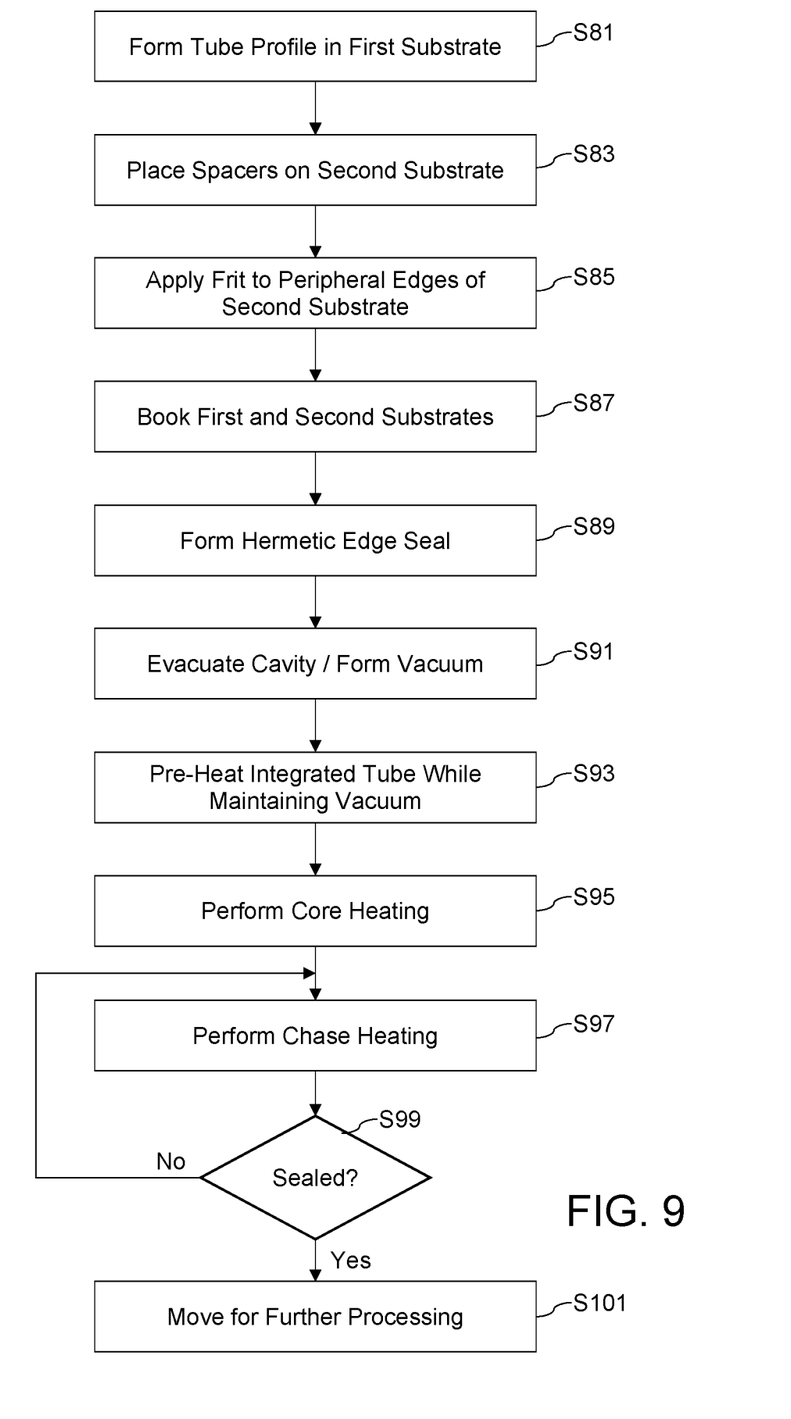
FIG. 9 is a flowchart showing an example process for making a VIG unit in connection with an integrated pump-out tube, in accordance with certain example embodiments.

FIG. 9 is a flowchart showing an example process for making a VIG unit in connection with an integrated pump-out tube, in accordance with certain example embodiments. In step S81, the integrated pump-out tube profile is formed in the first substrate, e.g., via one or more drilling operations or the like. Spacers or pillars are placed on the second substrate in step S83. In step S85, frit material is applied to peripheral edges of the second substrate. The first and second substrates are booked together in step S87 so that a cavity is formed therebetween, and a hermetic edge seal is formed in step S89 (e.g., via laser heating, heating in an oven, using infrared heaters, and/or the like). The cavity is evacuated to a pressure less than atmospheric in step S91. The integrated tube optionally is pre-heated in step S93, e.g., while maintaining the vacuum. This may be accomplished using an oven, using infrared heaters, via a laser, etc. Core heating is performed in step S95, and chase heating is performed in step S97 repeatedly until a sealed (e.g., as indicated in step S99). The core heating process of step S95 provides the bulk of the melting process, whereas the chase heating of step S97 is provided at progressively smaller circumferences, areas, and/or the like, e.g., depending on the configuration of the sidewall(s)/sealing arm(s), the through-hole, the developing sag, etc. Once sealed, the unit may be moved for further processing in step S101.

It will be appreciated that the steps in the FIG. 9 and example process may be performed in any suitable order, by different parties, and/or that further steps may be provided in different example embodiments. For instance, different parties may form the hole compared to parties who seal the VIG and/or port. In certain example embodiments, a tube profile will be formed in the first substrate, the first and/or second substrate may be tempered, frit may be applied to the peripheral edges of the first and/or second substrate, spacers may be placed, and then other operations may be performed, e.g., as shown in FIG. 9.

Figure 10:
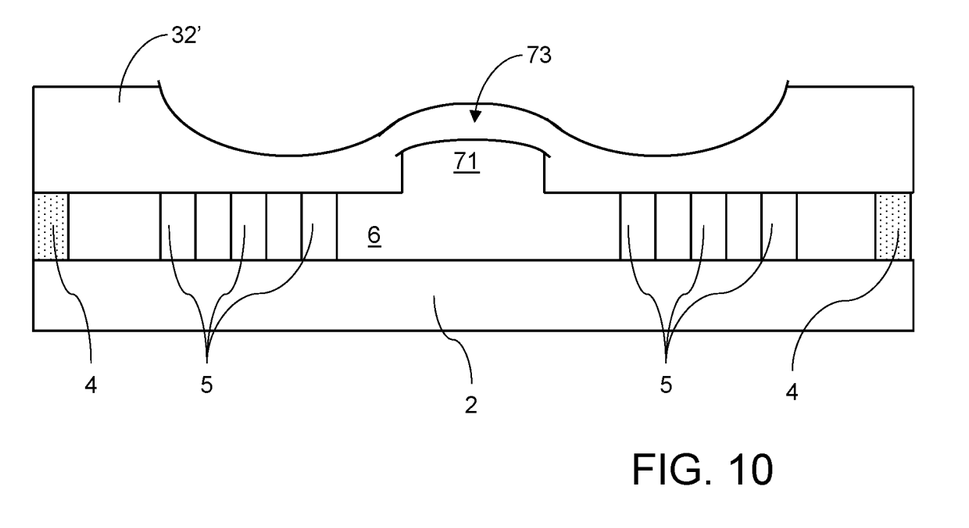
FIG. 10 is an assembled VIG unit made in accordance with certain example embodiments.

FIG. 10 is an assembled VIG unit made in accordance with certain example embodiments. The first substrate 32' includes the cover or bridge 73 resulting from the integrated pump-out tube as described above. The first and second substrates 32', 2 are hermetically sealed together via the frit-based edge seal 4 and are held in substantially parallel spaced apart relation via pillars 5 such that a gap or cavity 6 is defined therebetween.

It will be appreciated that techniques disclosed herein may be used in a wide variety of applications including for example, in VIG window applications, merchandizers, laminated products, hybrid VIG units (e.g., units where a substrate is spaced apart from a VIG unit via a spacer system), etc.

The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments. These processes may be adapted to involve different times and/or temperatures.

As used herein, the terms "on," "supported by," and the like should not be interpreted to mean that two elements are directly adjacent to one another unless explicitly stated. In other words, a first layer may be said to be "on" or "supported by" a second layer, even if there are one or more layers therebetween.

In certain example embodiments, a method of making a vacuum insulating glass (VIG) unit is provided. First and second glass substrates are provided. An integrated pump-out tube is formed in the first substrate such that, when viewed in cross-section, the first glass substrate includes (a) first and second channel portions provided adjacent to opposite sides of a through-hole and (b) first and second sealing wall portions defined therebetween. The first and second substrates are sealed together in connection with an edge seal provided around peripheral edges of the first and/or second substrates, a cavity being defined by the first and second substrates, and a plurality of spacers being provided between the first and second substrates in the cavity and helping to maintain the first and second substrates in substantially parallel, spaced-apart relation to one another. The cavity is evacuated to a pressure less than atmospheric. The first and second sealing wall portions are preferentially heated to cause them to sag together and form a bridge covering the through-hole and hermetically sealing the VIG unit.

In addition to the features of the previous paragraph, in certain example embodiments, the channel portions may be formed to be parts of a single channel surrounding the through-hole and/or the sealing wall portions are formed to be parts of a single sealing wall surrounding the through-hole.

In addition to the features of either of the two previous paragraphs, in certain example embodiments, the channel portions may be formed to at least initially be substantially U-shaped, substantially semi-circular, substantially trapezoidal, and/or the like, when viewed in cross-section.

In addition to the features of any of the three previous paragraphs, in certain example embodiments, the channel portions may be formed via drilling.

In addition to the features of any of the four previous paragraphs, in certain example embodiments, the preferential heating may include a core heating phase to substantially melt the sealing wall portions, followed by laser heating that causes the first and second sealing wall portions to sag together and form the bridge.

In addition to the features of any of the five previous paragraphs, in certain example embodiments, the preferential heating may be laser heating, e.g., performed such that the laser heating includes tracing the sealing wall portions as they sag towards one another in forming the bridge.

In certain example embodiments, a method of making a vacuum insulating glass (VIG) unit is provided. The method comprises having first and second glass substrates, the first substrate including an integrated pump-out tube therein, the first substrate, when viewed in cross-section, including (a) first and second channel portions provided adjacent to opposite sides of a through-hole and (b) first and second sealing wall portions defined therebetween. The first and second substrates are sealed together in connection with an edge seal provided around peripheral edges of the first and/or second substrates, a cavity being defined by the first and second substrates, and a plurality of spacers being provided between the first and second substrates in the cavity and helping to maintain the first and second substrates in substantially parallel, spaced-apart relation to one another. The cavity is evacuated to a pressure less than atmospheric. The first and second sealing wall portions are heated to cause them to sag together and form a bridge covering the through-hole and hermetically sealing the VIG unit.

In addition to the features of the previous paragraph, in certain example embodiments, the channel portions may be formed to be parts of a single channel surrounding the through-hole and/or the sealing wall portions may be formed to be parts of a single sealing wall surrounding the through-hole.

In addition to the features of either of the two previous paragraphs, in certain example embodiments, the channel portions may be formed via drilling.

In addition to the features of any of the three previous paragraphs, in certain example embodiments, the heating may include a first heating phase to substantially melt the sealing wall portions, followed by a second heating phase that causes the first and second sealing wall portions to sag together and form the bridge. For instance, the second heating phase may be practiced using a laser and optionally may involve tracing the sealing wall portions as they sag towards one another in forming the bridge.

In addition to the features of any of the four previous paragraphs, in certain example embodiments, the heating is laser heating.

In certain example embodiments, a method of making a vacuum insulating glass (VIG) unit subassembly is provided. A first glass substrate is provided. An integrated pump-out tube is formed in the first substrate such that, when viewed in cross-section, the first glass substrate includes (a) first and second channel portions provided adjacent to opposite sides of a through-hole and (b) first and second sealing wall portions defined therebetween. Following the forming of the integrated pump-out tube, the first substrate is forwarded to another party to: seal together the first substrate with a second substrate, in connection with an edge seal provided around peripheral edges of the first and/or second substrates, a cavity being defined by the first and second substrates, and a plurality of spacers being provided between the first and second substrates in the cavity and helping to maintain the first and second substrates in substantially parallel, spaced-apart relation to one another; evacuate the cavity to a pressure less than atmospheric; and heat the first and second sealing wall portions to cause them to sag together and form a bridge covering the through-hole and hermetically sealing the VIG unit.

In addition to the features of the previous paragraph, in certain example embodiments, the channel portions may be formed via drilling.

In addition to the features of either of the two previous paragraphs, in certain example embodiments, the channel portions may be formed to be parts of a single channel surrounding the through-hole and/or the sealing wall portions may be formed to be parts of a single sealing wall surrounding the through-hole.

Certain example embodiments relate to a vacuum insulating glass (VIG) unit made by the method of any of the 14 previous paragraphs. Similarly, certain example embodiments relate to a first substrate provided in accordance with any of the 14 previous paragraphs.

In certain example embodiments, a substrate for use in a vacuum insulating glass (VIG) unit, comprises an integrated pump-out tube in the substrate such that, when viewed in cross-section, the first glass substrate includes (a) first and second channel portions provided adjacent to opposite sides of a through-hole and (b) first and second sealing wall portions defined therebetween.

In certain example embodiments, a vacuum insulating glass (VIG) unit comprises first and second glass substrates maintained in substantially parallel, spaced apart relation to one another via a hermetic edge seal and a plurality of spacers disposed in a cavity defined between the first and second glass substrates, the cavity being evacuated to a pressure less than atmospheric using a plugless pump-out port hermetically sealed with a glass bridge melted from a portion of the first glass substrate surrounding the plugless pump-out port.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vacuum insulating glass (VIG) unit, comprising:
    first and second glass substrates maintained in substantially parallel, spaced apart relation to one another via a hermetic edge seal and a plurality of spacers disposed in a cavity defined between the first and second glass substrates;
    the first glass substrate having a plugless pump-out port integrally defined therein, so that when viewed in cross-section the first glass substrate includes (a) first and second channel portions defined in the glass substrate provided adjacent to opposite sides of the plugless pump-out port, and (b) first and second sealing wall portions defined between the pump-out port and the first and second channel portions, respectively.

2. The vacuum insulating glass (VIG) unit of claim 1, wherein the plugless pump-out port is configured to be sealed with a glass bridge melted from the first glass substrate surrounding a hole of the port after the cavity has been evacuated to a pressure less than atmospheric pressure.

3. The vacuum insulating glass (VIG) unit of claim 1, wherein a height of a top of the plugless pump-out port is no greater than a height of a flat upper major surface of the first glass substrate.

4. A vacuum insulating glass (VIG) unit, comprising:
    first and second glass substrates maintained in substantially parallel, spaced apart relation to one another via a hermetic edge seal and a plurality of spacers disposed in a cavity defined between the first and second glass substrates, the cavity being at a pressure less than atmospheric pressure;
    the first glass substrate having a plugless pump-out port integrally defined therein, so that when viewed in cross-section the first glass substrate includes (a) first and second channel portions defined in the glass substrate provided adjacent to opposite sides of the plugless pump-out port, and (b) first and second sealing wall portions defined between the pump-out port and the first and second channel portions, respectively.

5. The vacuum insulating glass (VIG) unit of claim 4, wherein a height of a top of the plugless pump-out port is no greater than a height of a flat upper major surface of the first glass substrate.

* * * * *